US005096581A

United States Patent [19]

Purvey

[11] Patent Number: 5,096,581

[45] Date of Patent: Mar. 17, 1992

[54] CENTRIFUGAL OIL FILTER

[75] Inventor: Ronald J. Purvey, Axminster, England

[73] Assignee: AE PLC, Rugby, England

[21] Appl. No.: 373,865

[22] Filed: Jun. 30, 1989

Related U.S. Application Data

[63] Continuation of Ser. No. 72,691, Jul. 13, 1987, abandoned.

[30] Foreign Application Priority Data

Jul. 23, 1986 [GB] United Kingdom ................. 8618006

[51] Int. Cl.[5] .............................................. B01D 33/04

[52] U.S. Cl. .................................... 210/232; 210/367; 210/416.5; 494/36; 494/49; 494/64; 494/901

[58] Field of Search ..................... 494/36, 49, 64, 901; 210/232, 238, 360.1, 365, 416.4, 416.5, 367; 123/196 A, 196 R

[56] References Cited

U.S. PATENT DOCUMENTS

| | | | |
|---|---|---|---|
| 4,032,447 | 6/1977 | Douglass | 210/360.1 |
| 4,431,540 | 2/1984 | Budzich | 210/360.1 |
| 4,492,631 | 1/1985 | Martin | 484/901 |
| 4,534,860 | 8/1985 | Budzich | 210/354 |
| 4,557,831 | 12/1985 | Lindsay et al. | 210/360.1 |

*Primary Examiner*—Richard V. Fisher
*Assistant Examiner*—Wanda L. Millard
*Attorney, Agent, or Firm*—William R. Hinds

[57] ABSTRACT

Centrifugal oil filters are described comprising a rotatable centrifugal cleaning cartridge, a shaft for rotation thereon, a co-operating member for connecting the filter assembly to a source of fluid to be cleaned, an outer casing member, a closure member for sealing one end of the casing member and a fluid drain conduit and wherein the centrifugal cleaning cartridge may be removed without removal of the outer casing member or disconnection of the fluid drain conduit.

2 Claims, 3 Drawing Sheets

CENTRIFUGAL OIL FILTER

This is a continuation of application Ser. No. 072,691 filed July 13, 1987, now abandoned.

FIELD OF THE INVENTION

The present invention relates to filters and particularly to the type known as centrifugal filters used for the filtration of, for example, engine oil, fuel or transmission oil etc.

BACKGROUND OF THE INVENTION

Centrifugal filters normally comprise a rotatable centrifugal filter cartridge and a body or housing assembly which contains the necessary spindle etc., for rotation of the cartridge.

In our U.S. Pat. No. 4,498,898 of common ownership herewith the filter assembly depends from a top support connected to an engine; access to the cartridge is by removal of a large oil drain-pipe and the outer body casing. When such filters are mounted adjacent the engine in the under bonnet space of, for example, a diesel engine powered truck access is often very limited and at best awkward.

The present invention seeks to avoid the problem of having to remove the filter body casing and associated oil drain-pipes each time the cartridge is required to be removed.

SUMMARY OF THE INVENTION

According to the present invention, a centrifugal filter assembly for the separation of contaminants from engine or transmission oil, the assembly being immediately adjacent an engine or transmission, comprises a generally cylindrical outer casing having an open lower end and sealingly connected at the upper end to a cooperating member on the engine or on the transmission, from which cooperating member the assembly depends in a downward direction and through which cooperating member oil is admitted directly to the filter assembly, a fixed shaft in the outer casing and having thereon a disposable cleaning cartridge rotatable on the fixed shaft, the cartridge being substantially of fabricated sheet metal construction, a removable closure member for sealing the open lower end of the outer casing, and an oil drain on the lower side wall of the outer casing for returning oil to the engine or transmission whereby access to the disposable cartridge and removal and replacement thereof may be gained by removal of the closure member only without removal or disconnection of the outer casing or the oil drain.

In order that the present invention may be more fully understood examples will now be described by way of illustration only with reference to the accompanying drawings of which:

DESCRIPTION OF THE PREFERRED EMBODIMENTS

Figure 1:
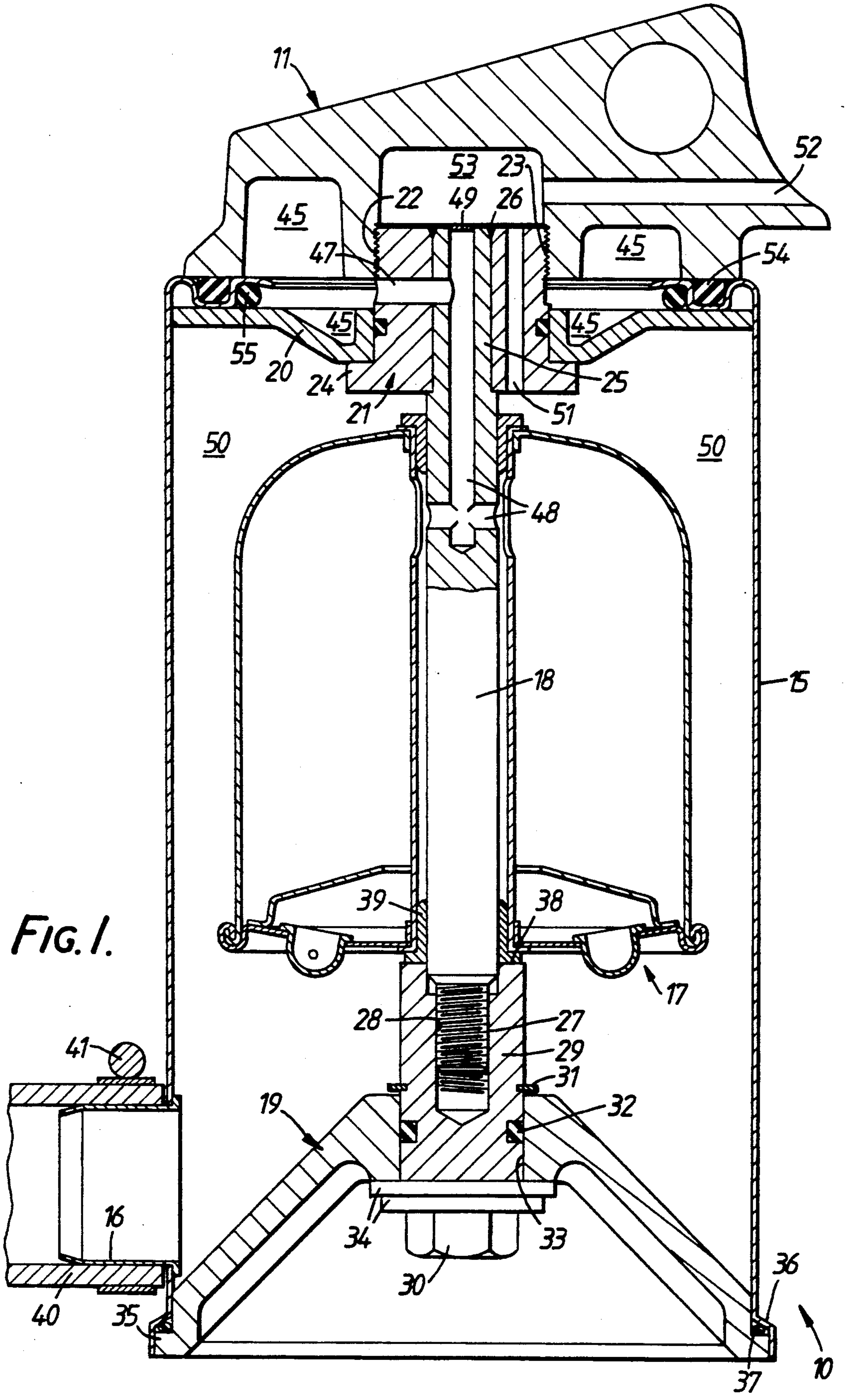
FIG. 1 shows a section through a first embodiment of a filter according to the present invention.

Referring now to FIG. 1 where an oil filter assembly is shown generally at 10. The filter 10 is attached to an engine by an adaptor 11 on the engine crankcase (not shown). The oil filter assembly 10 comprises an outer casing 15 having an oil drain conduit 16 in the wall at the lower end thereof, a rotatable centrifugal cleaning cartridge 17, a shaft 18 on which the cartridge 17 may rotate, a closure member 19 and a co-operating member which itself comprises a plate 20 and securing union 21. The plate 20 fits inside the outer casing 15 at the upper end thereof. The plate 20 and casing 15 are secured to the adaptor 11 by the union 21 which has a male threaded portion 22 which co-operates with a female threaded portion 23 in the adaptor 11; the plate 20 and casing 15 being retained by a flange 24 of the union 21. The shaft 18 is fixed at its upper end 25 to the union 21 by welds 26. At the lower end of the shaft 18 is a male threaded portion 27 which co-operates with a female threaded portion 28 of a sleeve nut 29 having a hexagonal headed portion 30 and grooves for a circlip 31 and 'O' ring seal 32. The sleeve nut 29 passes sealably, due to the 'O' ring 32 through an aperture 33 in the closure member 19 and retains the closure member 19 by washers 34. An outer shoulder and flange 35 of the closure member 19 locates in the lower open end 36 of the casing 15 and is sealed by an 'O' ring seal 37. The sleeve nut 29 has an upper face 38 against which the thrust face of a bearing 39 of the cartridge 17 may rotate. A pipe 40 is secured to the oil drain conduit 16 by a clip 41 to drain filtered oil to the engine sump (not shown). At the upper end of the filter an annular chamber 45 is formed between the adaptor 11 and the plate 20. Oil under pressure is supplied to the chamber 45 from the engine oil pumping system (not shown). Oil is fed to the cartridge 17 via conduits 47 and 48 drilled in the union 21 and shaft 18 respectively. The conduit 48 is sealed at the top 49. Once in the cartridge 17 the oil drives the cartridge by reaction force and is centrifuged in a known manner. Oil issuing from the cartridge 17 drains away to the engine sump via the conduit 16 and pipe 40. A substantially even pressure is maintained in the oil filter chamber 50 by means of vent conduits 51 and 52 formed in the union 21 and adaptor 11 respectively. The space 53 does not contain oil and links the vents 51 and 52. Oil is prevented from leaking out of the chamber 45 to the atmosphere by the seal 54. Similarly oil is prevented from leaking into the chamber 50 from chamber 45 and thus by-passing the cartridge 17 by the seal 55.

To remove the cartridge 17 all that need be done is for the sleeve nut 29 to be unscrewed and removed with the closure member 19, the nut 29 and member 19 being prevented from separating by the circlip 31. Once the nut 29 and member 19 have been removed the cartridge 17 may also be withdrawn. The casing 15, conduit 16 and its associated pipe 40 remain undisturbed facilitating changing of the cartridge 17.

Figure 2:
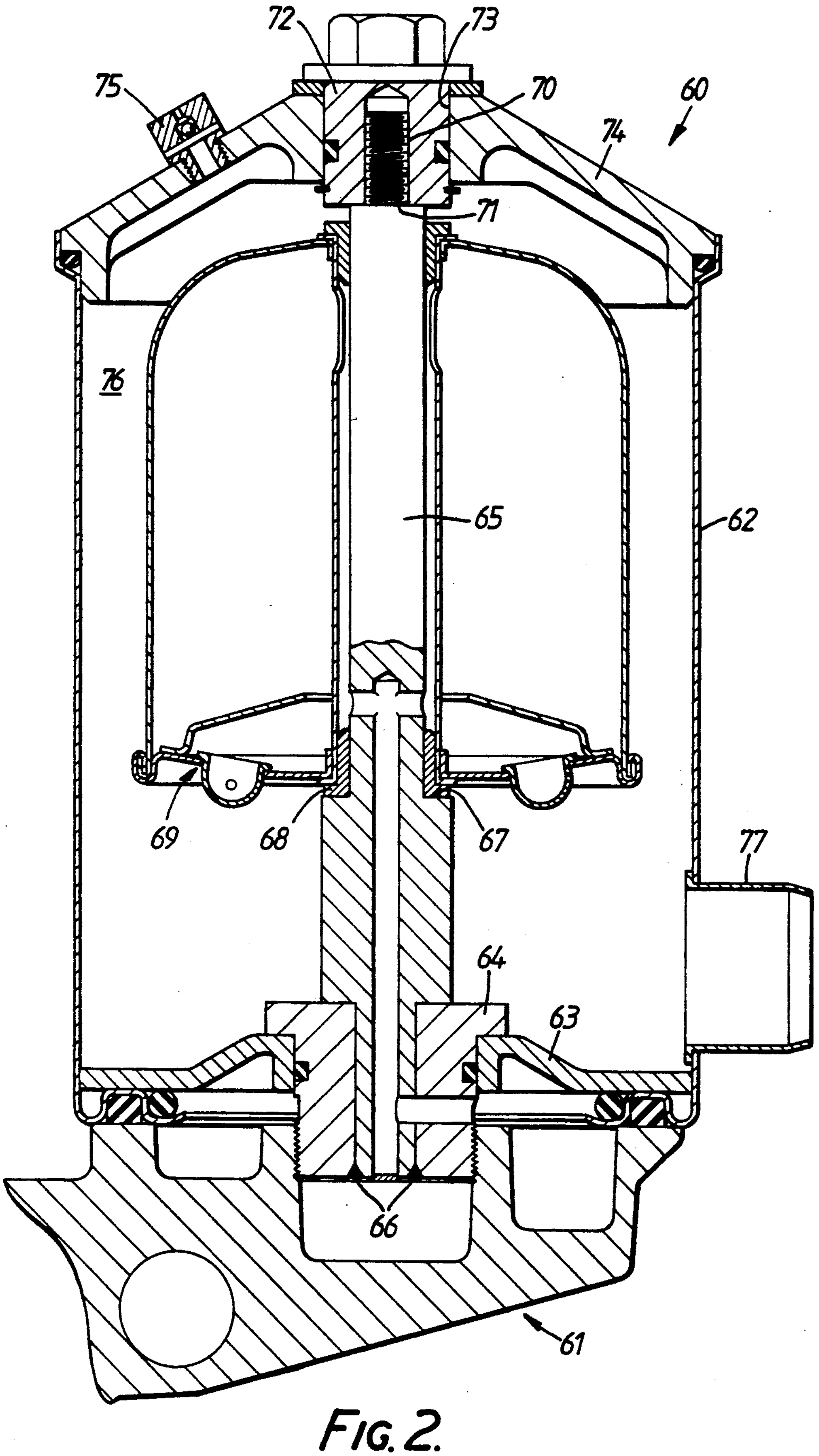
FIG. 2 shows a different filter assembly.

FIG. 2 shows an assembly wherein the centrifugal filter assembly 60 is supported by its lower end in an upstanding fashion from the adaptor 61. The outer casing 62 is connected to the adaptor 61 by a co-operating member comprising a plate 63 and union 64 in a similar manner to the embodiment of FIG. 1. A shaft 65 is fixed to the union by welds 66 and includes a shoulder 67 which provides a bearing surface for the lower bearing 68 of the rotatable centrifugal cartridge 69. The upper end of the shaft 65 has a male threaded portion 70 which co-operates with a female threaded portion 71 of a sleeve nut 72. The sleeve nut passes through an aperture 73 in a cover member 74. Retention and sealing arrangements are essentially as described with reference to FIG. 1 except for the one-way valve 75 which allows air to enter the chamber 76 to prevent a vacuum forming and thereby impeding outward flow of oil via the conduit 77. Oil flow arrangements are again essentially similar to those given with reference to FIG. 1.

Access to the cartridge 69 is simply by unscrewing the sleeve nut 72 which is removed together with the cover member 74. The cartridge may be removed, replaced with a fresh component and the cover replaced. The outer casing and associated oil drainage piping is left completely undisturbed during this operation.

Figure 3:
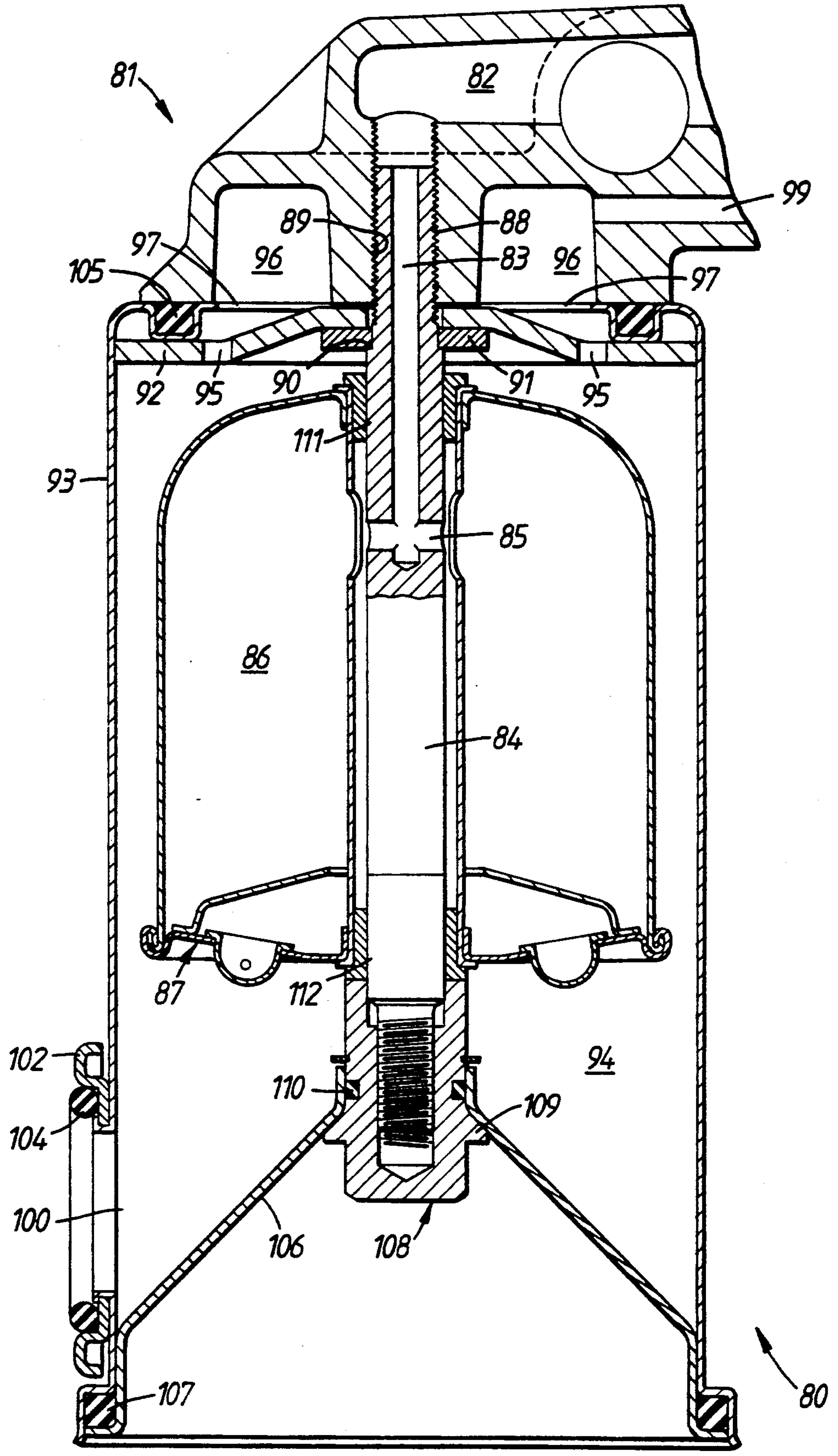
FIG. 3 shows another embodiment according to the present invention which is a modification of the filter shown in FIG. 1.

FIG. 3 shows a modified version of the filter of FIG. 1. The modifications are mainly concerned with the oil flow to and oil sealing arrangements within the filter and which seek to simplify the construction. The filter assembly is shown generally at 80. An adaptor 81 comprises an oil supply gallery 82 which supplies oil under pressure to a conduit 83 in a shaft 84. Oil issues from the conduit 83 via a cross-drilled hole 85 into a chamber 86 of a rotatable centrifuge cartridge 87. The cartridge 87 being driven in known manner as above. The shaft 84 has a male threaded portion 88 at its upper end which screws into a co-operating female threaded portion 89 in the adaptor 81. The shaft 84 has a shoulder 90 supporting a washer 91 which in turn supports a retaining plate 92. The retaining plate 92 serves to locate and support the filter outer casing 93. A vacuum is prevented from forming in the chamber 94 by a vent arrangement which comprises apertures 95 in the plate 92 which is connected to an annular gallery 96 by apertures 97 in the top end of the casing 93; the gallery 96 itself being vented to the engine crankcase (not shown) via the conduit 99. Oil issuing from the cartridge 87 drains away to the engine sump via the conduit 100 which connects to the engine crankcase by means of a flanged member 102 which is bolted directly thereto and is sealed by the 'O' ring 104. Oil is prevented from leaking out from between the adaptor 81 and the top end of the casing 93 by means of the oil seal 105. The lower end of the casing 93 is closed by a pressed steel closure member 106 sealed to the outer casing by an oil seal 107. The closure member 106 is secured to the casing 93 by means of a sleeve nut 108 having a tapered flange 109. Oil sealing between the member 106 and sleeve nut 108 is effected by an 'O' ring seal 110. The shaft 84 has equal diameter journal portions 111 and 112 which allows the cartridge 87 to be removed from below.

I claim:

1. A centrifugal filter assembly for the separation of contaminants from engine or transmission oil, the assembly being immediately adjacent an engine or transmission and comprising a generally cylindrical outer casing having an open lower end and sealingly connected at the upper end to a cooperating member on said engine or on said transmission, from which cooperating member said assembly depends in a downward direction and through which cooperating member oil is admitted directly to said filter assembly, a fixed shaft in the outer casing and having thereon a disposable cleaning cartridge rotatable on said fixed shaft, said cartridge being substantially of fabricated sheet metal construction, a removable closure member for sealing said open lower end of the outer casing, and an oil drain on the lower side wall of the outer casing for returning oil to the engine or transmission whereby access to the disposable cartridge and removal and replacement thereof may be gained by removal of said closure member only with removal or disconnection of said outer casing or said oil drain.

2. A filter assembly according to claim 1 wherein said oil drain is connected directly to the engine or transmission.

* * * * *

UNITED STATES PATENT AND TRADEMARK OFFICE

CERTIFICATE OF CORRECTION

PATENT NO. : 5,096,581

DATED : March 17, 1992

INVENTOR(S) : Ronald J. Purvey

It is certified that error appears in the above—identified patent and that said Letters Patent is hereby corrected as shown below:

In Claim 1 at column 4, line 35, "with" is changed to --without--.

Signed and Sealed this

Twenty-fifth Day of May, 1993

Attest:

Michael K. Kirk

MICHAEL K. KIRK

*Attesting Officer*

*Acting Commissioner of Patents and Trademarks*